United States Patent
Pankratov (10) Patent No.: US 10,450,865 B2
(45) Date of Patent: Oct. 22, 2019

(54) FRICTION DAMPER

(71) Applicant: Pratt & Whitney Canada Corp., Longueuil (CA)

(72) Inventor: Maksim Pankratov, Mississauga (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 603 days.

(21) Appl. No.: 15/166,588

(22) Filed: May 27, 2016

(65) Prior Publication Data
US 2017/0342840 A1  Nov. 30, 2017

(51) Int. Cl.
*F01D 5/10* (2006.01)
*F16F 15/129* (2006.01)
*F16F 7/06* (2006.01)

(52) U.S. Cl.
CPC ........... *F01D 5/10* (2013.01); *F16F 7/06* (2013.01); *F16F 15/129* (2013.01); *F05D 2220/323* (2013.01); *F05D 2240/20* (2013.01); *F05D 2250/184* (2013.01); *F05D 2260/96* (2013.01)

(58) Field of Classification Search
CPC ... F01D 5/00; F01D 5/10; F01D 25/04; F01D 25/06
See application file for complete search history.

(56) References Cited

U.S. PATENT DOCUMENTS

| | | | |
|---|---|---|---|
| 4,817,455 A | 4/1989 | Buxe | |
| 4,848,182 A * | 7/1989 | Novotny | F01D 5/027 464/180 |
| 5,373,922 A | 12/1994 | Marra | |
| 5,582,077 A | 12/1996 | Agram | |
| 7,458,769 B2 | 12/2008 | Forgue et al. | |
| 8,328,519 B2 | 12/2012 | Denis | |
| 8,747,054 B2 | 10/2014 | Witlicki | |
| 9,151,170 B2 | 10/2015 | El-Aini et al. | |
| 2013/0004313 A1 | 1/2013 | El-Aini | |
| 2014/0314578 A1 | 10/2014 | Xu | |

* cited by examiner

*Primary Examiner* — Igor Kershteyn
*Assistant Examiner* — John S Hunter, Jr.
(74) *Attorney, Agent, or Firm* — Norton Rose Fulbright Canada LLP (57) ABSTRACT

A damper ring is mounted in frictional engagement with a radially inwardly facing surface of a circumferential groove defined in a rotary part of a gas turbine engine. Energy dissipation is provided via sliding friction of the ring in the groove. Pressure relief dimples are provided around the outer diameter of the ring for locally reducing contact pressure at the outer diameter below a value at which the damper ring locks in the groove by friction forces when subject to centrifugal loads.

18 Claims, 6 Drawing Sheets

FRICTION DAMPER

TECHNICAL FIELD

The application relates generally to gas turbine engines and, more particularly, to a frictional damper arrangement for damping vibrations transmitted to a rotor.

BACKGROUND OF THE ART

Gas turbine engines contain rotating parts (e.g. turbine or compressor rotors, discs, seal runners, etc. . . . ), which are in some cases subject to high vibrations and therefore require mechanical dampers to reduce vibratory stresses to provide adequate field life. Conventional dampers are typically provided in the form of a wire ring installed in a corresponding groove defined in the rotating part. Such ring dampers are subjected to centrifugal load that creates a reaction force between the damper and the mating rotor part. In high speed applications, this force could be enough to stick the damper to the rotor by friction so that no relative sliding is maintained and damper effectiveness is lost because it deforms together with the rotor as one solid body. This phenomenon is referred to as damper lock by friction. When the damper effectiveness is lost, energy dissipation by the damper is significantly reduced resulting in rotor vibratory stress increase that reduces service life and could result in in-flight engine failure.

SUMMARY

In one aspect of an embodiment, there is provided a damper ring mountable in a groove defined on a circumferentially inner surface of a rotor of a gas turbine engine to provide a friction damper assembly, the damper ring comprising: an outer circumferential surface configured to be centrifugally loaded against a radially inwardly facing surface of the groove, a plurality of circumferentially spaced-apart pressure relief dimples defined in the outer circumferential surface of the damper ring, the pressure relief dimples being configured to locally reduce the contact pressure at the outer circumferential surface of the damper ring below a threshold value at which friction forces lock the damper ring against movement in a circumferential direction relative to the rotor.

In a further aspect, there is provided a gas turbine engine rotor mounted for rotation about an axis, the rotor comprising: a body defining a circumferential groove having a radially inwardly facing surface, at least one damper ring mounted in the circumferential groove, the at least one damper ring having a plurality of pressure relief dimples formed at spaced intervals in an outer circumferential surface thereof and leaving circumferentially extending lands therebetween, in use, the at least one damper ring being displaceable under a centrifugal load from a first position, in which the lands are in contact with the radially inwardly facing surface of the circumferential groove while the pressure relief dimples are spaced radially inwardly therefrom, to a second position, in which the pressure relief dimples are deformed under the centrifugal load in contact with the radially inwardly facing surface of the circumferential groove.

In a still further general aspect, there is provided a method of providing frictional damping for a rotor of a gas turbine engine, the rotor having a circumferential groove with a radially inwardly facing surface, the method comprising: providing at least one damper ring configured to be centrifugally loaded against the radially inwardly facing surface of the circumferential groove of the rotor when the rotor is rotatably driven; and adjusting a contact pressure between an outer circumferential surface of the at least one damper ring and the radially inwardly facing surface of the groove below a threshold value at which the at least one damper ring locks against movement in a circumferential direction relative to the rotor when subject to centrifugal loads of a magnitude corresponding to centrifugal loads encountered during normal engine operation, wherein adjusting comprises providing pressure relief dimples at circumferential intervals in at least one of the radially inwardly facing surface of the circumferential groove and the outer circumferential surface of the at least one damper ring.

DESCRIPTION OF THE DRAWINGS

Reference is now made to the accompanying figures in which.

DETAILED DESCRIPTION

Figure 1:
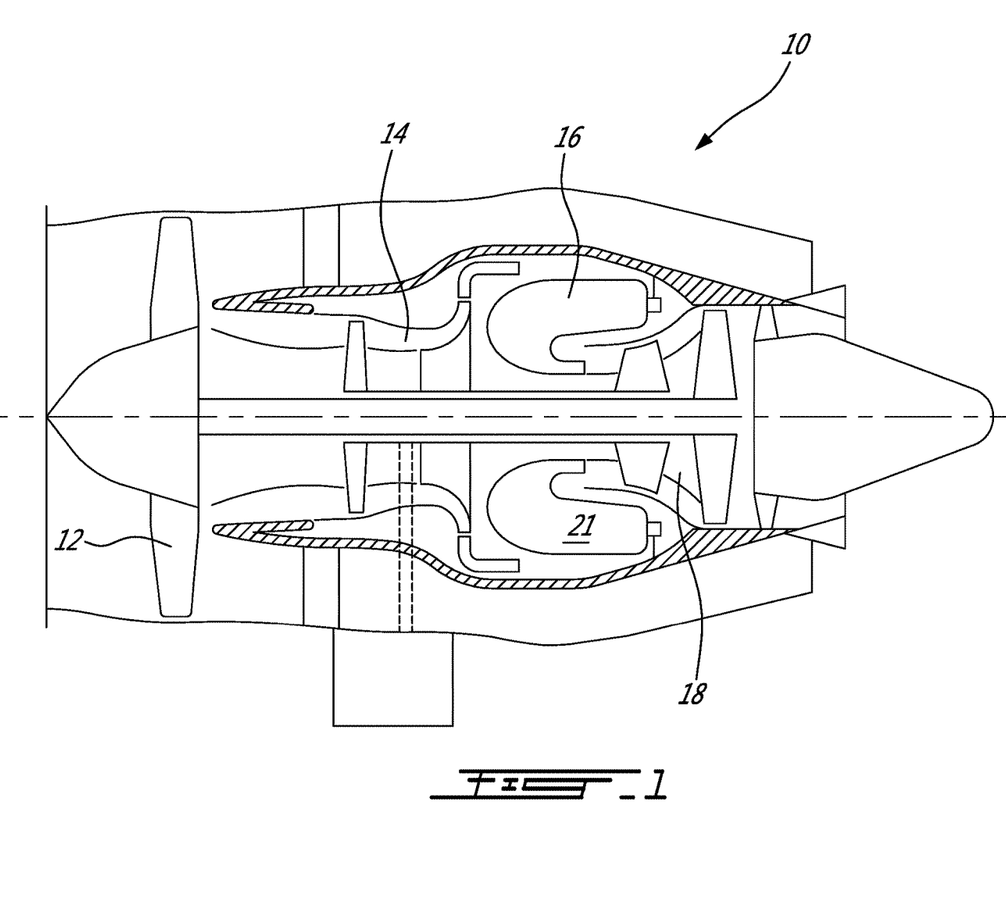
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 having a combustion chamber 21 in which the compressed air is mixed with fuel and ignited for generating an annular stream of hot combustion gases, and a turbine section 18 for extracting energy from the combustion gases.

Figure 2:
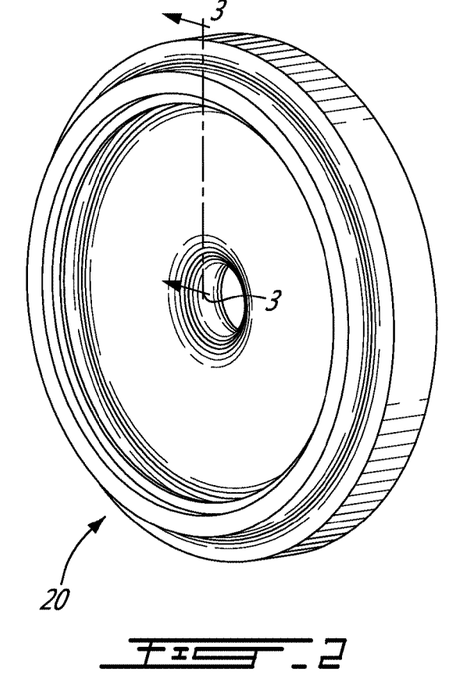
FIG. 2 is an isometric view of a rotor of the gas turbine engine.

FIG. 2 illustrates a rotary part or rotor 20 of the engine 10. The rotor 20 can take various forms. For instance, the rotor 20 can be a compressor or turbine disk, a seal runner, a turbine cover or any other rotary parts requiring vibration damping.

Figure 3:
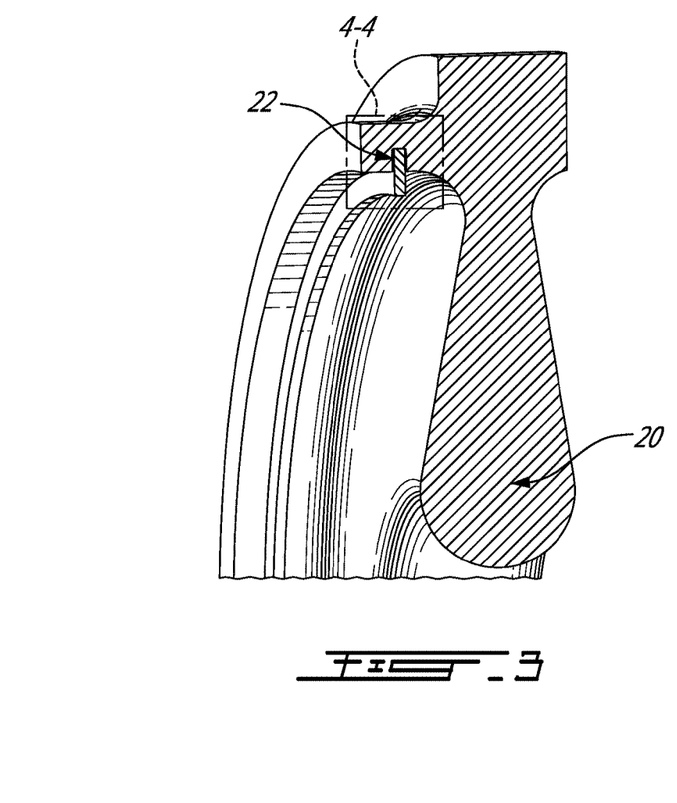
FIG. 3 is a cross-section taken along lines A-A in FIG. 2.
Figure 4A:
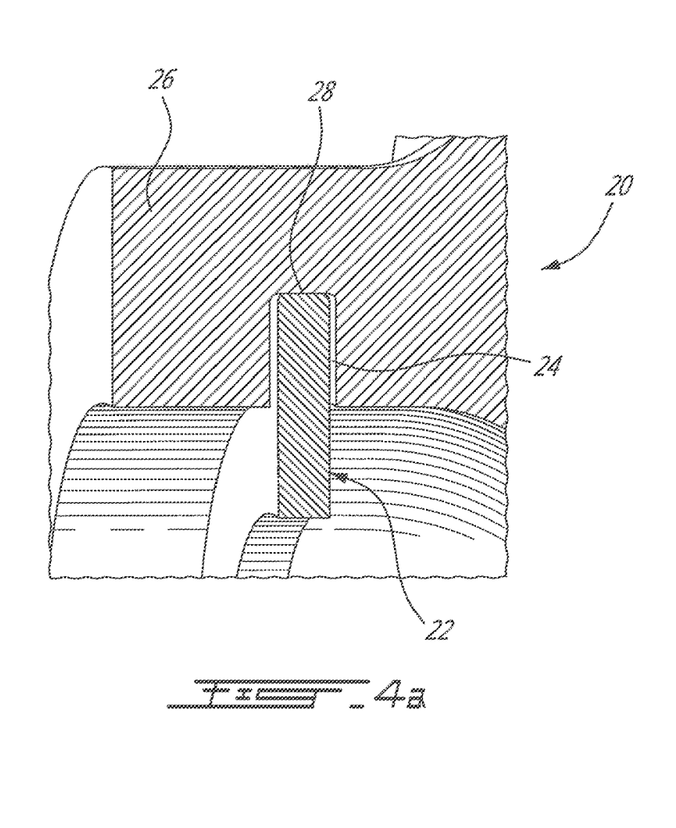
FIG. 4a is an enlarged cross-section view showing a damper ring installed in a circumferential groove defined in the rotor.
Figure 5A:
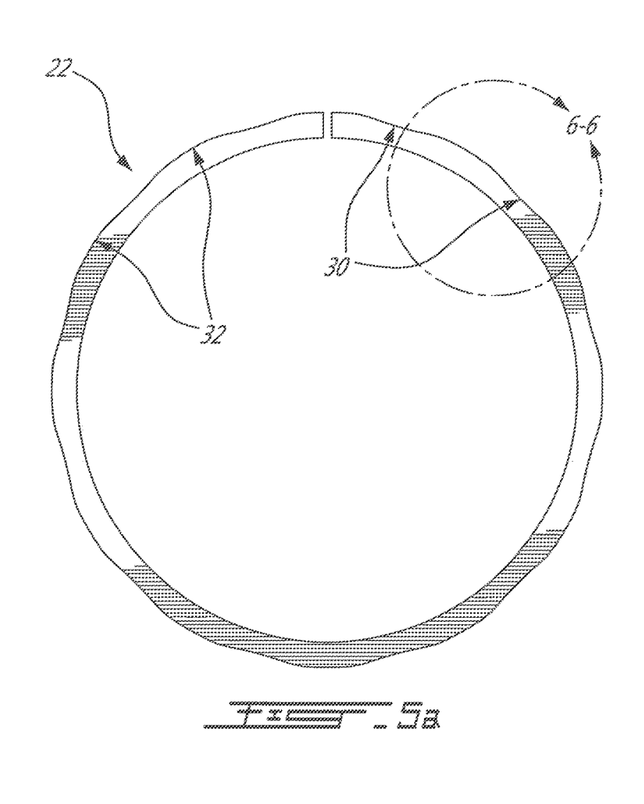
FIG. 5a is a front view of the damper ring with pressure relief dimples on its outer diameter.
Figure 5B:
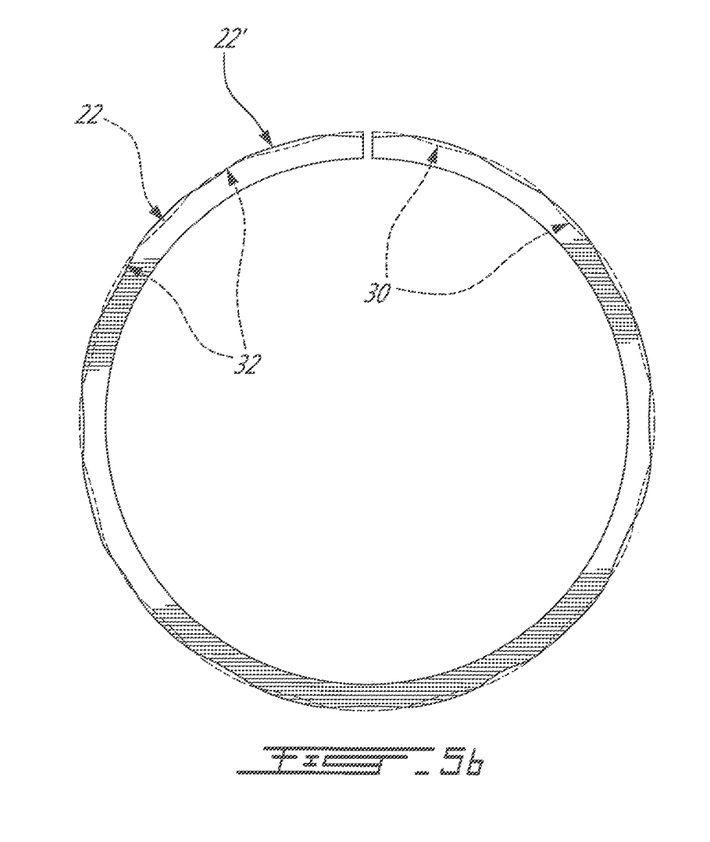
FIG. 5b illustrates different dimple shapes around the circumference of two superposed damper rings.

As shown in FIGS. 3 and 4a, a friction damper, including at least one damper ring 22, may be mounted in an associated circumferential groove 24 defined in an annular flange 26 projecting axially from one face of the rotor 20. As shown in FIG. 5a, the ring 22 may be split to allow the same to be contracted to a smaller diameter in order to facilitate its installation in the rotor groove 24, as known in the art. Once positioned in the groove 24, the ring 22 springs back towards its relax state against the bottom wall of the groove 24, thereby retaining the ring 22 in place in the absence of centrifugal loading (i.e. when the engine is not running). In use, the centrifugal load firmly urges the damper ring 22 in contact with the radially inwardly facing surface 28 (i.e. the circumferentially extending bottom wall) of the groove 24. Energy is absorbed via sliding friction. The friction generated between the relative motion (i.e. the slippage in the circumferential direction between the damper ring 22 and the rotor 20) of the two surfaces that press against each other under the centrifugal load is used as a source of energy dissipation. However, for the damping system to effectively work, some relative vibratory slippage between the damper ring 22 and the rotor 20 must be maintained even when subjected to high centrifugal loads such as those encountered when the engine 10 is operating at high regimes. For high speed applications, like small gas turbine engines, the centrifugal force may become so high that the friction forces tend to lock the damper ring 22 in place in the groove 24, thereby preventing relative vibratory slippage in the circumferential direction between the ring 22 and the rotor 20. At high rotation speeds, the friction forces may become so high that the damper ring 22 basically sticks to the rotor 20. When the damper ring 22 sticks in the rotor groove 24, the rotor 20 and the ring 22 becomes like one solid body. In such a case, no more vibration damping is provided.

Figure 6:
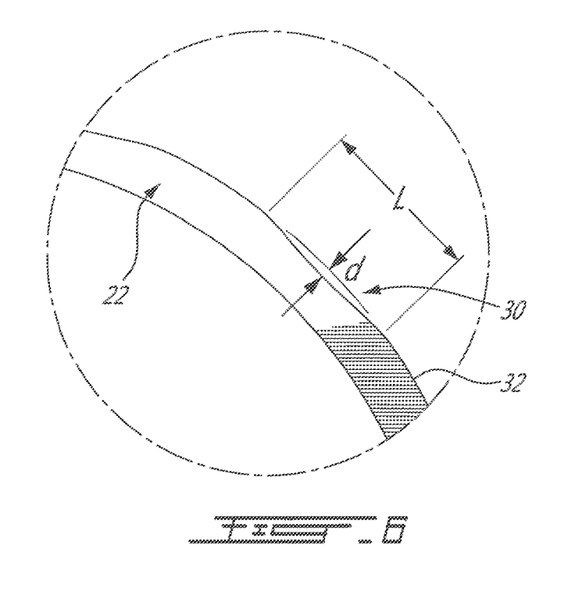
FIG. 6 is an enlarged view of a section of the damper ring illustrating an optimized shape and configuration of a pressure relief dimple to provide adequate reduction of the contact pressure between the damper ring and the groove during operation, thereby preserving relative slippage between the ring and the groove.

Such lock by friction phenomenon can be avoided by appropriately reducing the contact pressure and, thus, the frictions forces, between the ring 22 and the groove 24. For instance, as shown in FIGS. 5a and 6, circumferentially spaced-apart pressure relief dimples 30 could be defined in the outer circumferential surface of the ring 22. The term "dimple" is herein intended to refer to any suitable type of depression or discontinuity in the ring outer circumference and is, thus, not limited to regularly shaped circular depressions. As will be seen hereinafter, the shape and configuration of the dimples can be optimized to locally reduce the contact pressure to a value which is less that a threshold value at which the ring is friction locked in the groove.

The dimples 30 leave therebetween inter-dimple lands 32 or high points on the outer diameter of the ring 22. These lands 32 provide a circumferentially discontinuous primary contact surface with the groove 24 to react the centrifugal load.

When assembled to the rotor 20, the ring 22 will contact the radially inwardly facing surface 28 of the groove 24 at the lands 32 (or high points) only. Accordingly, in this state, contact forces are solely transmitted at the lands 32. That is in the initial or "non-loaded" state, there will be no contact between the ring 22 and the groove 24 at circumferential locations corresponding to the pressure relief dimples 30. Indeed, the recessed surface of the dimples 30 will be spaced radially inwardly from the radially inwardly facing surface 28 of the groove 24 and, thus, no contact forces will be transmitted in the dimple areas. However, upon accelerating the engine to operational speeds, the rotation of the rotor 20 will cause the damper ring 22 to deform under the centrifugal load. At one point, the radial bending of the ring 22 at each pressure relief dimple 30 will cause the ring 22 to contact the radially inwardly facing surface 28 of the groove 24 even in the dimple areas. However, the contact pressure will be smaller in these areas in comparison to conventional rings because part of the centrifugal (CF) force will be compensated by the stiffness of the damper (i.e. the force required to deform it). The reduction of contact pressure generally corresponds to the force required to deform the ring 22 so that that the recessed surface of the pressure relief dimples 30 contacts the bottom 28 of the groove 24. In this way, the reduction of contact pressure may be calibrated to preserve the required vibratory slippage between the ring 22 and the groove 24 even at high rotation speeds where a conventional ring would tend to stick to the bottom of the groove (damper lock by friction).

Figure 7:
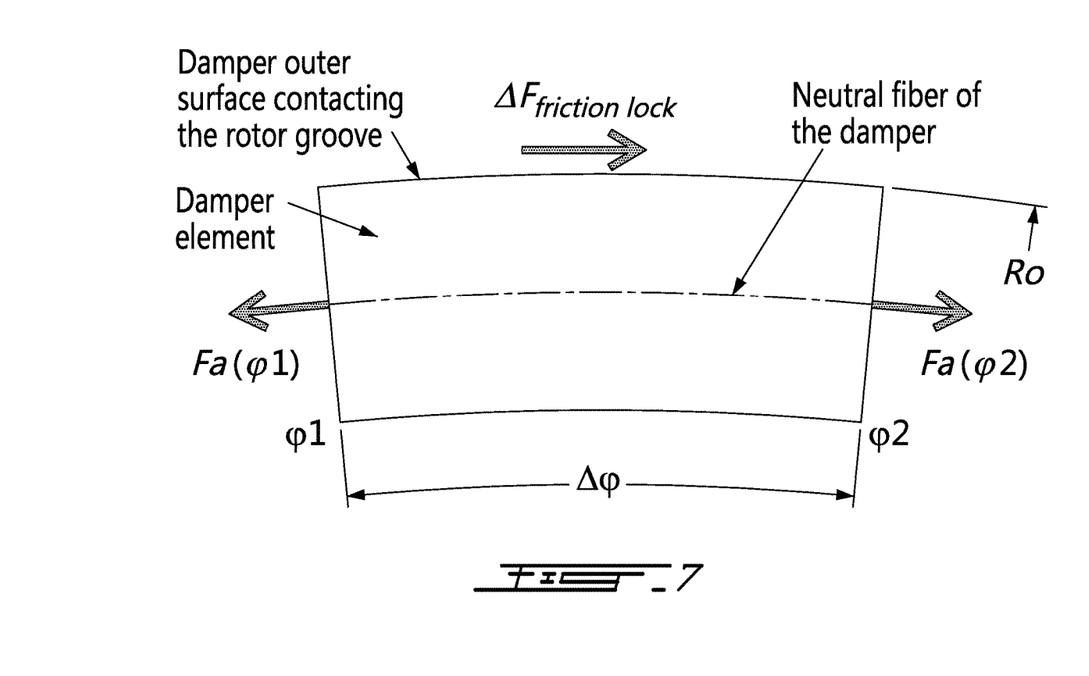
FIG. 7 is a force balance diagram of the damper ring.

Optimal dimple shapes could be achieved, for example, by finite element (FE) contact analysis of a numerical model of a damper ring installed in the rotor groove and subjected to a specified centrifugal load. By using computer simulation, each damper ring could be specifically designed for its intended application. To do so, the FE analysis or other suitable numerical analysis should consider the radial bending of the damper in the dimple areas and provide resultant contact pressure (that is reduced because of this bending). An iterative approach can be taken to establish the dimple configuration needed to obtain the desired contact pressure reduction to avoid locking of the ring for a given centrifugal (CF) load condition. The outcome of the optimization allows to define the shape that the dimples must have so that the line contact pressure [lb/in] (contact force per unit length of the damper circumference) in the dimples area is below the pressure that is required to lock the damper by friction. The threshold value line contact pressure [lb/in] required to lock the damper by friction could be calculated by FE transient dynamic analysis (with taking in account friction forces) or analytical method, as known by person skilled in the art. In general analytical method of calculation of the pressure that is required to lock the damper by friction at any given point on circumference is based on the equation of the forces equilibrium in circumferential direction of the infinitely small element of the damper (equilibrium occurs when damper element sticks to the bottom of the groove by friction and no sliding occurs (so called damper lock by friction phenomenon). As schematically depicted in FIG. 7, the forces to be considered in this equation are the internal tensile or compressive vibratory force acting on the damper element from each side and friction force applied to the damper element at the contact surface with the groove. Equation of equilibrium states that sum of the friction force and internal forces acting on this infinitely small element should be equal zero:

$$\Delta F_{friction\ lock} + Fa(\varphi 2) - Fa(\varphi 1) = 0$$

$$\Delta F_{friction\ lock} = -(Fa(\varphi 2) - Fa(\varphi 1))$$

$$\varphi 2 - \varphi 1 = \Delta \varphi \rightarrow 0 \quad [1]$$

Where $\Delta F_{friction\ lock}$, [lbf] is the friction force acting on the damper element at the contact with the groove $Fa(\varphi)$, [lbf] is the internal tensile (positive sign) or compression (negative sign) vibratory force acting in circumferential direction at the given section of the damper defined by circumferential coordinate $\varphi$ $Fa(\varphi 1)$ is the internal vibratory force at the left side of the damper element (at section $\varphi = \varphi 1$)

$Fa(\varphi 2)$ is the internal vibratory force at the right side of the damper element (at section $\varphi = (\varphi 2)$ Equation [1] defines what friction force is required to lock the damper element in circumferential direction. If actual friction force (based on CF pressure and friction coefficient) is less than the right side of the equation [1], then equilibrium will not be achieved and this element of the damper will slide in circumferential direction.

Contact pressure $P_{lock}$, [lbf/in] that is the contact force (caused by CF load) per unit length of the damper outer circumference at any given point on the circumference, required to lock the damper by friction at this point, can be derived from the equation [1]. It will be the function of the following parameters:

$$P_{lock}(\varphi)=P_{lock}(A(\varphi),E,\dot{\varepsilon}_o(\varphi),\dot{\varepsilon}_{o\ bending}(\varphi),\mu,Ro) \quad [2]$$

Where $\varphi$, [rad] is the angular coordinate that defines the point on the damper circumference $A(\varphi)$, [in^2] is the area of the damper cross-section at any given point on circumference defined by angular coordinate $\varphi$ (i.e. $\pi d^2/4$ for the round damper wire with the cross-section diameter d) that in general case will vary over circumference because dimples will cause cross-section area variation $E$, [psi] is the modulus of elasticity of the damper $\dot{\varepsilon}_o$ ($\varphi$) is the circumferential vibratory strain gradient (strain rate) in circumferential direction (calculated as the first derivative versus circumferential coordinate $\varphi$) at the bottom of the rotor groove where it contacts with the damper $\dot{\varepsilon}_{o\ bending}$ ($\varphi$) is the circumferential vibratory bending strain gradient (strain rate) in circumferential direction (calculated as the first derivative versus circumferential coordinate $\varphi$) of the damper outer surface where it contacts with the rotor groove. This strain rate is due to damper bending only (bending is caused by radial vibratory displacement of the rotor groove where damper is installed)

$\mu$ is the friction coefficient (between damper and rotor groove)

Ro, [in] is the radius of the outer surface of the damper when installed in the rotor groove (basically it is equal to the rotor groove inner radius)

The shape of the pressure relief dimples 30 can be configured by iterative FE analysis to ensure that contact pressure at any point on the circumference in the dimple area is below the value defined by formula [2] when the center of the dimple coincides with the peak of the differential strain MAX ($|\dot{\varepsilon}_o(\varphi)-\dot{\varepsilon}_{o\ bending}(\varphi)|$). By doing this, it can be ensured that when the traveling vibratory wave of the rotor part passes in circumferential direction across the dimple 30, at the moment when peak of the circumferential differential vibratory strain (differential between the damper bending strain and the groove strain) MAX ($|\dot{\varepsilon}_o(\varphi)-\dot{\varepsilon}_{o\ bending}(\varphi)|$) coincides with the center of the dimple 30, sliding between the damper ring 22 and the rotor groove 24 will occur in circumferential direction across the whole dimple length. Optimum ratio between $P_{lock}$ and actual contact pressure could be selected in the dimples area in order to further improve the design and maximize the friction work for the given vibration mode shape and amplitude. This optimization could be done by experimental rig tests, FE transient contact analysis with friction and sliding or by further developing the analytical methods.

The length (L) of the dimples 30 in the circumferential direction is selected to maintain adequate bending stress of the damper ring 22 in the dimples areas. As shown in the embodiment illustrated in FIG. 6, the dimples 30 have a shallow profile. The depth (d) of the dimples 30 is smaller than the length (L) thereof. As shown in FIG. 5a, the dimples 30 may define a flattened sinusoidal-like profile at the outer diameter of the ring 22. The smooth blending transitions between the dimples 30 and the lands 32 provides for a smoother stress distribution around the circumference of the ring 22.

Figure 4B:
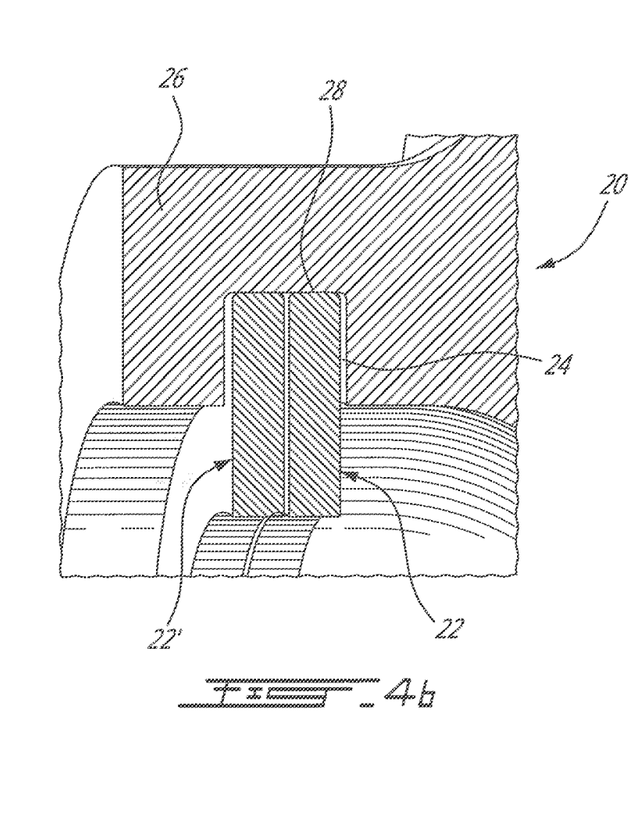
FIG. 4b illustrates an embodiment comprising two damper rings, the rings having different dimple shapes.

While the dimples 30 shown in FIG. 5a have a same and unique shape, it is understood that the dimples 30 could have different shapes around the circumference of the ring 22 to target smaller and higher vibration amplitudes. Also the dimples 30 could have a regular pattern (good in most cases for engine rotor parts where vibration is a travelling wave) as shown or an irregular pattern to provide added damping efficiency for a standing wave type vibration. Also, as shown in FIGS. 4b and 5a, the friction damper could comprises several damper rings 22, 22' with different dimple shapes for installation in the rotor groove 24 in order to specifically target small and high amplitude vibrations and different mode shapes.

The pressure relief dimples 30 can be precisely machined on a CNC grinder while the damper ring 22 is held by a fixture clamping down against opposed flat sides of the ring 22. Other suitable manufacturing processes are contemplated as well.

The above description is meant to be exemplary only, and one skilled in the art will recognize that changes may be made to the embodiments described without departing from the scope of the invention disclosed. For instance, while maybe less practical from a manufacturing point of view, it is understood that the pressure relief dimples could be defined in the bottom surface of the rotor groove instead than in the outer circumferential surface of the damper ring. Other modifications which fall within the scope of the present invention will be apparent to those skilled in the art, in light of a review of this disclosure, and such modifications are intended to fall within the appended claims.

The invention claimed is:

1. A damper ring mountable in a groove defined on a circumferentially inner surface of a rotor of a gas turbine engine to provide a friction damper assembly, the damper ring comprising:
    an outer circumferential surface configured to be centrifugally loaded against a radially inwardly facing surface of the groove; and
    a plurality of circumferentially spaced-apart pressure relief dimples defined in the outer circumferential surface of the damper ring, the pressure relief dimples being configured to locally reduce a contact pressure at the outer circumferential surface of the damper ring below a threshold value at which friction forces lock the damper ring against movement in a circumferential direction relative to the rotor, wherein, in use, the pressure relief dimples are deformable into contact with the radially inwardly facing surface of the groove.

2. The damper ring defined in claim 1, wherein the pressure relief dimples have a depth less than a length in a circumferential direction of the pressure relief dimples.

3. The damper ring defined in claim 1, wherein the pressure relief dimples provide the outer circumferential surface of the damper ring with a generally sinusoidal profile in the circumferential direction.

4. The damper ring defined in claim 1, wherein the pressure relief dimples include pressure relief dimples of different shapes relative to each other around a circumference of the damper ring.

5. The damper ring defined in claim 1, wherein the pressure relief dimples form a pattern in which a same shape is repeated at regular intervals around a circumference of the damper ring.

6. The damper ring defined in claim 1, further comprising an additional damper ring, a shape of the pressure relief dimples of the damper ring being different from a shape of the pressure relief dimples of the additional damper ring.

7. A gas turbine engine rotor mounted for rotation about an axis, the rotor comprising:

a body defining a circumferential groove having a radially inwardly facing surface; and at least one damper ring mounted in the circumferential groove, the at least one damper ring having a plurality of pressure relief dimples formed at spaced intervals in an outer circumferential surface of the at least one damper ring and leaving circumferentially extending lands therebetween, in use, the at least one damper ring being displaceable under a centrifugal load from a first position, in which the lands are in contact with the radially inwardly facing surface of the circumferential groove while the pressure relief dimples are spaced radially inwardly therefrom, to a second position, in which the pressure relief dimples are deformed under the centrifugal load into contact with the radially inwardly facing surface of the circumferential groove.

8. The gas turbine engine rotor defined in claim 7, wherein in the second position, a contact pressure between the deformed pressure relief dimples and the radially inwardly facing surface of the circumferential groove is less than a pressure required to lock the at least one damper ring by friction in the circumferential groove.

9. The gas turbine engine rotor defined in claim 8, wherein in the second position, a contact pressure between the lands and the radially inwardly facing surface of the circumferential groove is greater than the contact pressure between the deformed pressure relief dimples and the radially inwardly facing surface.

10. The gas turbine engine rotor defined in claim 8, wherein a depth of the pressure relief dimples is less than a length of the pressure relief dimples in a circumferential direction.

11. The gas turbine engine rotor defined in claim 8, wherein the outer circumferential surface of the at least one damper ring has a sinusoidal profile in a circumferential direction.

12. The gas turbine engine rotor defined in claim 8, wherein the pressure relief dimples include pressure relief dimples of different shapes relative to each other around a circumference of the at least one damper ring.

13. The gas turbine engine rotor defined in claim 8, wherein the pressure relief dimples form a pattern in which a same shape is repeated at regular intervals around a circumference of the at least one damper ring.

14. The gas turbine engine rotor defined in claim 8, wherein the at least one damper ring includes a first and a second damper ring, a pressure relief dimples of the first damper ring having a shape different from a shape of the second damper ring.

15. A method of providing frictional damping for a rotor of a gas turbine engine, the rotor having a circumferential groove with a radially inwardly facing surface, the method comprising: providing at least one damper ring configured to be centrifugally loaded against the radially inwardly facing surface of the circumferential groove of the rotor when the rotor is rotatably driven; and adjusting a contact pressure between an outer circumferential surface of the at least one damper ring and the radially inwardly facing surface of the groove below a threshold value at which the at least one damper ring locks against movement in a circumferential direction relative to the rotor when subject to centrifugal loads of a magnitude corresponding to centrifugal loads encountered during engine operation, wherein adjusting comprises providing pressure relief dimples at circumferential intervals in the outer circumferential surface of the at least one damper ring, where the pressure relief dimples are deformed into contact with the radially inwardly facing surface of the groove.

16. The method of claim 15, wherein adjusting further comprises:

conducting a contact analysis on a numerical model of a computer simulation of the at least one damper installed in the circumferential groove of the rotor and subjected to said centrifugal loads; and determining the threshold value of the contact pressure at which the friction between the at least one damper ring and the radially inwardly facing surface of the groove causes the at least one damper ring to be locked against movement in the circumferential direction.

17. The method of claim 16, wherein adjusting further comprises optimizing the shape of the pressure relief dimples so that the contact pressure at each of the pressure relief dimples be locally inferior to the threshold value.

18. The method of claim 17, wherein optimizing the shape of the pressure relief dimples comprises determining the internal tensile or compressive force acting on the at least one damper ring from each side of a given point on the outer circumference surface of the at least one ring as well as a friction force at this given point of contact with the circumferential groove.

* * * * *